UNITED STATES PATENT OFFICE.

CHARLES GOFFINET, OF LEOPOLD, INDIANA.

IMPROVEMENT IN MEDICAL COMPOUNDS.

Specification forming part of Letters Patent No. 128,385, dated June 25, 1872.

*To all whom it may concern:*

Be it known that I, CHARLES GOFFINET, of Leopold, in the county of Perry and State of Indiana, have invented a certain composition, which I call "Goffinet's Imperial Galvanic Medicine," for the cure of ophthalmia, and all diseases of the eye, cuts, bruises, burns, old sores, ulcers, and all diseases of the skin arising from impurities of the blood, scrofula, or syphilis, and female diseases, such as whites; and I do hereby declare that the following is a full, clear, and exact description of the same.

The nature of my invention consists in mixing carbonate of protoxide of copper and sulphate of zinc in the following proportion: Take of carbonate of protoxide of copper one dram and one-half ounce of sulphate of zinc, and place the ingredients in a neat stone jar which has never been used for any purpose, and pour on the mixture one gallon of clear rain-water, boiling, or some other soft water, also boiling; then close hermetically until cold, when it is ready for use; then put in bottles, first stirring well the solution that the ingredients may be proportionately distributed in each bottle.

The manner of using the medicine is as follows: For ophthalmia and all diseases of the eye generally, pour in the eye a few drops of the liquid, and bathe well the eyelids with a cloth saturated with the medicine, especially on retiring to bed in the evening. Repeat three or four times a day until relief is obtained. For whites, use the medicine by injections; and for all other diseases above enumerated, bathe well the affected parts with the medicine, and apply cloths well saturated with the medicine three or four times a day, or oftener if necessary, until a cure is effected. In every instance shake well the bottle before using.

My imperial galvanic medicine will not be affected by age.

What I claim as new, and desire to secure by Letters Patent of the United States, is—

The manufacture or preparation of a compound, which is denominated "Goffinet's Imperial Galvanic Medicine," of the ingredients and in the proportions substantially as set forth.

In testimony whereof I have signed my name to this specification in the presence of two subscribing witnesses.

CHARLES GOFFINET.

Witnesses:
VICTOR MARCHAL,
JAMES PETER.